(12) United States Patent
Meller

(10) Patent No.: US 8,026,626 B1
(45) Date of Patent: Sep. 27, 2011

(54) AXIAL FLUX ALTERNATOR WITH AIR GAP MAINTAINING ARRANGEMENT

(76) Inventor: Moshe Meller, Tel Aviv (IL)

( * ) Notice: Subject to any disclaimer, the term of this patent is extended or adjusted under 35 U.S.C. 154(b) by 0 days.

(21) Appl. No.: 12/980,589

(22) Filed: Dec. 29, 2010

Related U.S. Application Data

(60) Provisional application No. 61/416,439, filed on Nov. 23, 2010.

(51) Int. Cl.
*H02P 9/00* (2006.01)
*F03D 9/00* (2006.01)

(52) U.S. Cl. .......................................... 290/55; 310/268

(58) Field of Classification Search ................... 290/55; 310/268
See application file for complete search history.

(56) References Cited

U.S. PATENT DOCUMENTS

| | | | |
|---|---|---|---|
| 2,153,523 A | | 4/1939 | Roberts et al. |
| 2,388,377 A | | 11/1945 | Albers |
| 3,699,372 A | * | 10/1972 | Abe et al. .................. 310/268 |
| 4,039,848 A | | 8/1977 | Winderl |
| 4,073,516 A | | 2/1978 | Kling |
| 4,084,102 A | | 4/1978 | Fry et al. |
| 4,165,468 A | | 8/1979 | Fry et al. |
| 4,166,569 A | | 9/1979 | Begnaud et al. |
| 4,166,596 A | | 9/1979 | Mouton, Jr. et al. |
| 4,213,057 A | | 7/1980 | Are |
| 4,219,303 A | | 8/1980 | Mouton, Jr. et al. |
| 4,285,481 A | | 8/1981 | Biscomb |
| 4,309,006 A | | 1/1982 | Biscomb |
| 4,345,161 A | | 8/1982 | Crompton |
| 4,350,898 A | | 9/1982 | Benoit |
| 4,350,899 A | | 9/1982 | Benoit |
| 4,358,243 A | | 11/1982 | Heath |
| 4,383,182 A | | 5/1983 | Bowley |
| 4,450,364 A | | 5/1984 | Benoit |
| 4,470,563 A | | 9/1984 | Engelsman |
| 4,491,739 A | | 1/1985 | Watson |
| 4,495,423 A | | 1/1985 | Rogers |
| 4,547,124 A | | 10/1985 | Kliatzkin et al. |

(Continued)

FOREIGN PATENT DOCUMENTS

JP     57-070964 A     5/1982

(Continued)

OTHER PUBLICATIONS

U.S. Appl. No. 12/779,475, filed May 13, 2010; Title: "Wind Turbines Direct Drive Alternator System With Torque Balancing"; First Named Inventor: Moshe Meller.

*Primary Examiner* — Joseph Waks
(74) *Attorney, Agent, or Firm* — Holtz, Holtz, Goodman & Chick, PC

(57) ABSTRACT

Axial flux alternator for a wind turbine arrangement includes at least one magnetic disk including magnets and at least one coil disk including electromagnetic assemblies. One or both disks are mounted to wind turbines such that adjacent disks rotate in opposite directions, or such that the magnets of a magnetic disk move relative to the electromagnetic assemblies of an adjacent coil disk which may move or be stationary, or vice versa. Between adjacent disks, rolling elements on one disk roll, slide or move on or against the surface of the opposite disk in order to fix and maintain air gaps between the magnets on a magnetic disk and magnetic cores of the electromagnetic assemblies on the coil disk, and thus enable continued motion and use of the alternator.

20 Claims, 11 Drawing Sheets

U.S. PATENT DOCUMENTS

| | | | |
|---|---|---|---|
| 4,572,962 A | 2/1986 | Shepard | |
| 4,997,414 A | 3/1991 | Camara et al. | |
| 5,040,948 A | 8/1991 | Harburg | |
| 5,062,765 A | 11/1991 | McConachy | |
| 5,079,461 A * | 1/1992 | Schluter et al. | 310/67 A |
| 5,334,899 A * | 8/1994 | Skybyk | 310/268 |
| 5,506,453 A | 4/1996 | McCombs | |
| 5,798,632 A | 8/1998 | Muljadi | |
| 6,002,193 A * | 12/1999 | Canini et al. | 310/268 |
| 6,091,161 A | 7/2000 | Dehlsen et al. | |
| 6,127,739 A | 10/2000 | Appa | |
| 6,278,197 B1 | 8/2001 | Appa | |
| 6,285,090 B1 * | 9/2001 | Brutsaert et al. | 290/55 |
| 6,476,513 B1 | 11/2002 | Gueorguiev | |
| 6,492,743 B1 * | 12/2002 | Appa | 290/55 |
| 6,710,489 B1 * | 3/2004 | Gabrys | 310/90.5 |
| 6,781,254 B2 | 8/2004 | Roberts | |
| 6,945,747 B1 | 9/2005 | Miller | |
| 6,975,045 B2 | 12/2005 | Kurachi et al. | |
| 7,129,596 B2 | 10/2006 | Macedo | |
| 7,183,663 B2 | 2/2007 | Roberts et al. | |
| 7,190,101 B2 * | 3/2007 | Hirzel | 310/268 |
| 7,309,930 B2 | 12/2007 | Suryanarayanan et al. | |
| 7,317,261 B2 | 1/2008 | Rolt | |
| 7,335,000 B2 | 2/2008 | Ferguson | |
| 7,384,239 B2 | 6/2008 | Wacinski | |
| 7,402,934 B1 * | 7/2008 | Gabrys | 310/266 |
| 7,489,046 B2 | 2/2009 | Costin | |
| 7,582,981 B1 | 9/2009 | Meller | |
| 7,679,249 B2 | 3/2010 | Appa et al. | |
| 7,709,973 B2 | 5/2010 | Meller | |
| 7,723,861 B2 | 5/2010 | Meller | |
| 7,821,149 B2 | 10/2010 | Meller | |
| 7,830,033 B2 * | 11/2010 | Meller | 290/55 |
| 7,888,839 B2 * | 2/2011 | Gabrys et al. | 310/266 |
| 7,923,854 B1 * | 4/2011 | Meller | 290/55 |
| 2003/0111925 A1 * | 6/2003 | Strohm | 310/178 |
| 2004/0096327 A1 | 5/2004 | Appa et al. | |
| 2007/0228738 A1 | 10/2007 | Wrage et al. | |
| 2008/0023964 A1 | 1/2008 | Sureshan | |
| 2008/0048453 A1 | 2/2008 | Amick | |
| 2008/0296905 A1 | 12/2008 | Ferguson | |
| 2009/0152391 A1 | 6/2009 | McWhirk | |
| 2010/0032947 A1 | 2/2010 | Bevirt | |
| 2010/0032948 A1 | 2/2010 | Bevirt | |
| 2010/0032949 A1 | 2/2010 | Varrichio et al. | |
| 2010/0111697 A1 | 5/2010 | Wood | |
| 2010/0283252 A1 * | 11/2010 | Fradella | 290/55 |
| 2011/0140451 A1 * | 6/2011 | Sharples et al. | 290/55 |

FOREIGN PATENT DOCUMENTS

| | | |
|---|---|---|
| JP | 2-161173 A | 6/1990 |
| WO | WO 2007/051034 A2 | 5/2007 |

* cited by examiner

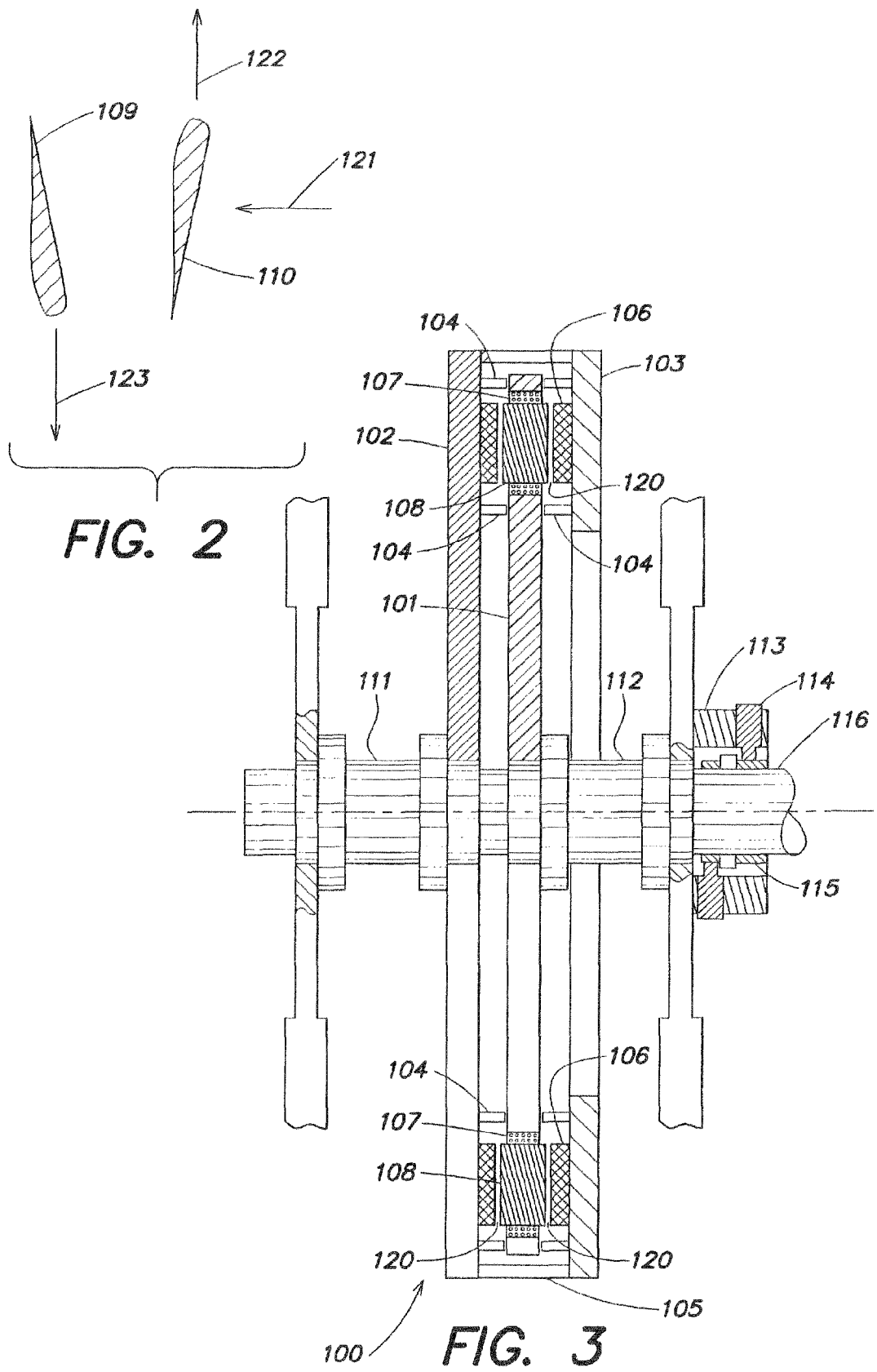

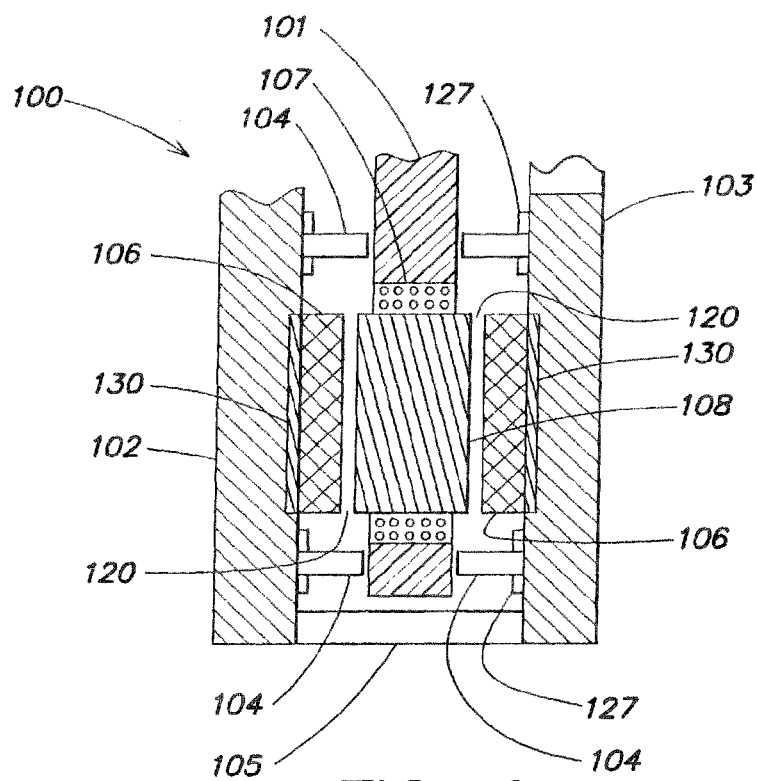
FIG. 9
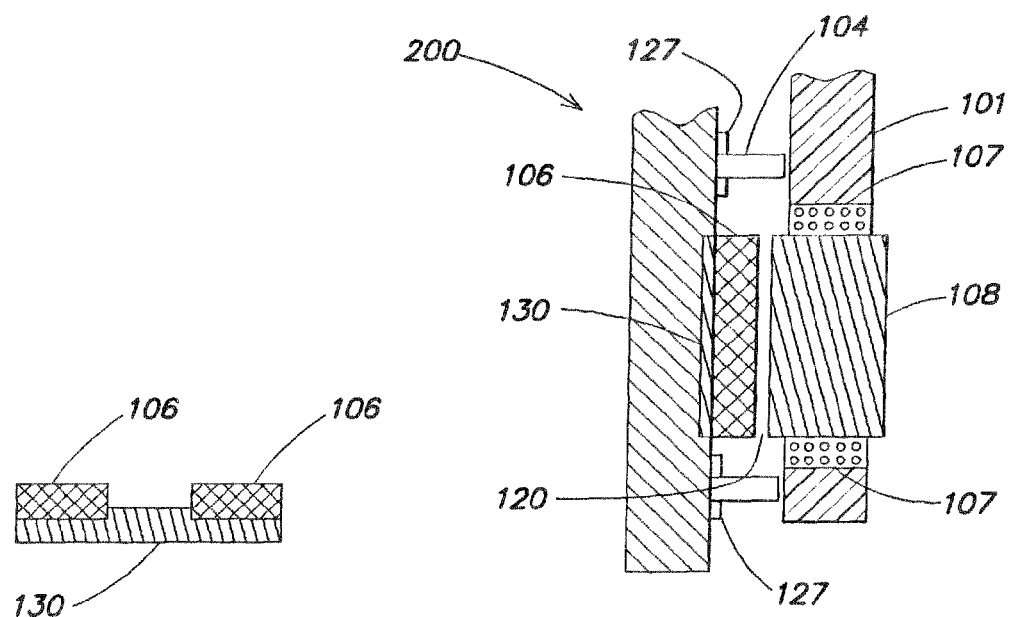
FIG. 10
FIG. 12

US 8,026,626 B1

AXIAL FLUX ALTERNATOR WITH AIR GAP MAINTAINING ARRANGEMENT

CROSS REFERENCE TO RELATED APPLICATION

This application claims priority under 35 U.S.C. §119(e) of U.S. provisional patent application Ser. No. 61/416,439 filed Nov. 23, 2010, incorporated by reference herein.

FIELD OF THE INVENTION

The present invention relates to axial flux type alternators for wind turbine arrangements that include magnets and coils that must be spaced apart from one another by an air gap to maintain functionality of the wind turbine alternator. The present invention also relates to a method for providing for and maintaining functionality or operability of a wind turbine arrangement including an axial flux type alternator.

BACKGROUND OF THE INVENTION

In order to produce electricity from a wind turbine, rotation of the wind turbines is transferred to an alternator, typically directly or through a transmission gear system. The alternator outputs an electromagnetic force (hereinafter "EMF") that is proportional to the revolutions per minute (hereinafter "RPM") of the alternator and to the strength of a magnetic field generated by relative movement of magnets to electromagnetic assemblies including coils wound around magnetic cores.

The need to capture more wind power, i.e., improve the conversion of the rotation of the wind turbine into electrical energy, is leading to an increase in the span of the turbine blades of the wind turbine. This, in turn, leads to lower RPM of the wind turbine. Consequently, a conventional wind turbine includes a transmission gear section that increases the RPM of the alternator. Some of the main disadvantages of this type of transmission gear section include: energy losses, lower overall efficiency, and higher weight and maintenance.

A wind turbine without a transmission gear section is often referred to as a direct drive wind turbine. A direct drive wind turbine alternator has a larger diameter, and there are two primary types of such alternators, a radial flux type and an axial flux type.

The present invention relates to axial flux alternators that usually include magnets and electromagnetic assemblies that move relative to one another and have an air gap therebetween. Constructing the alternator to provide a desired dimension for the air gap between the magnets and the coils of an axial flux alternator, also referred to herein as adjusting the air gap, and maintaining the air gap during operation of the wind turbine, is a technical challenge, particularly for a large diameter axial flux alternator.

OBJECTS AND SUMMARY OF THE INVENTION

An object of one or more embodiments of the present invention is to provide a system for providing an air gap in axial flux-alternators, and more particularly in large-diameter axial flux alternators, with a desired dimension and maintaining the air gap.

Another object of one or more embodiments of the present invention is to provide an air gap construction and maintenance system for axial flux alternators, again in particular for large-diameter axial flux alternators, that is economical and simple to construct.

An axial flux alternator in accordance with the present invention includes at least one magnetic disk including magnets and at least one coil disk including electromagnetic assemblies. Adjacent disks are preferably mounted to rotate in opposite directions, or otherwise such that the magnets of a magnetic disk move relative to the electromagnetic assemblies of an adjacent coil disk, which may move or be stationary, or vice versa. Between the disks, there are rolling elements, such as bearings, that are fixed to one of the disks and that roll, slide or otherwise move on or against the surface of the other disk. Alternatively, the rolling elements may be thrust bearings that roll on or against the surfaces of both adjacent disks, or other similar types of bearings that may be situated between opposed surfaces of adjacent disks and roll on or against both of the opposed surfaces.

The dimensions or diameters of the rolling elements fix the distance between the rotating disks and thereby set and operationally maintain an air gap between the surfaces of the magnets in the magnetic disk and the surfaces of the magnetic cores of the electromagnetic assemblies of the coil disk. Maintaining this air gap prevents the magnets on the magnetic disk from coming into contact with the magnetic cores on the coil disk and thereby allowing continuous motion and use of the wind turbine arrangement including the alternator.

In a wind turbine arrangement in accordance with the invention, the coil disk may be coupled to one wind turbine and the magnetic disk to another wind turbine, with the wind turbines rotating in opposite directions to one another. Alternatively, but not in preferred embodiments, the coil disk is coupled to one wind turbine and the magnetic disk is fixed, or vice versa.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein:

FIG. 2 is a cross section view of the wind turbine blades;

FIG. 3 is a detailed side view of the alternator in accordance with the present invention;

FIG. 9 is a partial cross-sectional view of the alternator in accordance with the invention showing an alternative mounting of magnets on the magnetic disks of the alternator;

FIG. 10 is a cross-sectional view of the magnet mounting shown in FIG. 9;

FIG. 12 is an enlarged, partial cross-sectional view of the alternator shown in FIG. 11 showing structure around the air gap;

DETAILED DESCRIPTION OF THE INVENTION

Figure 1:
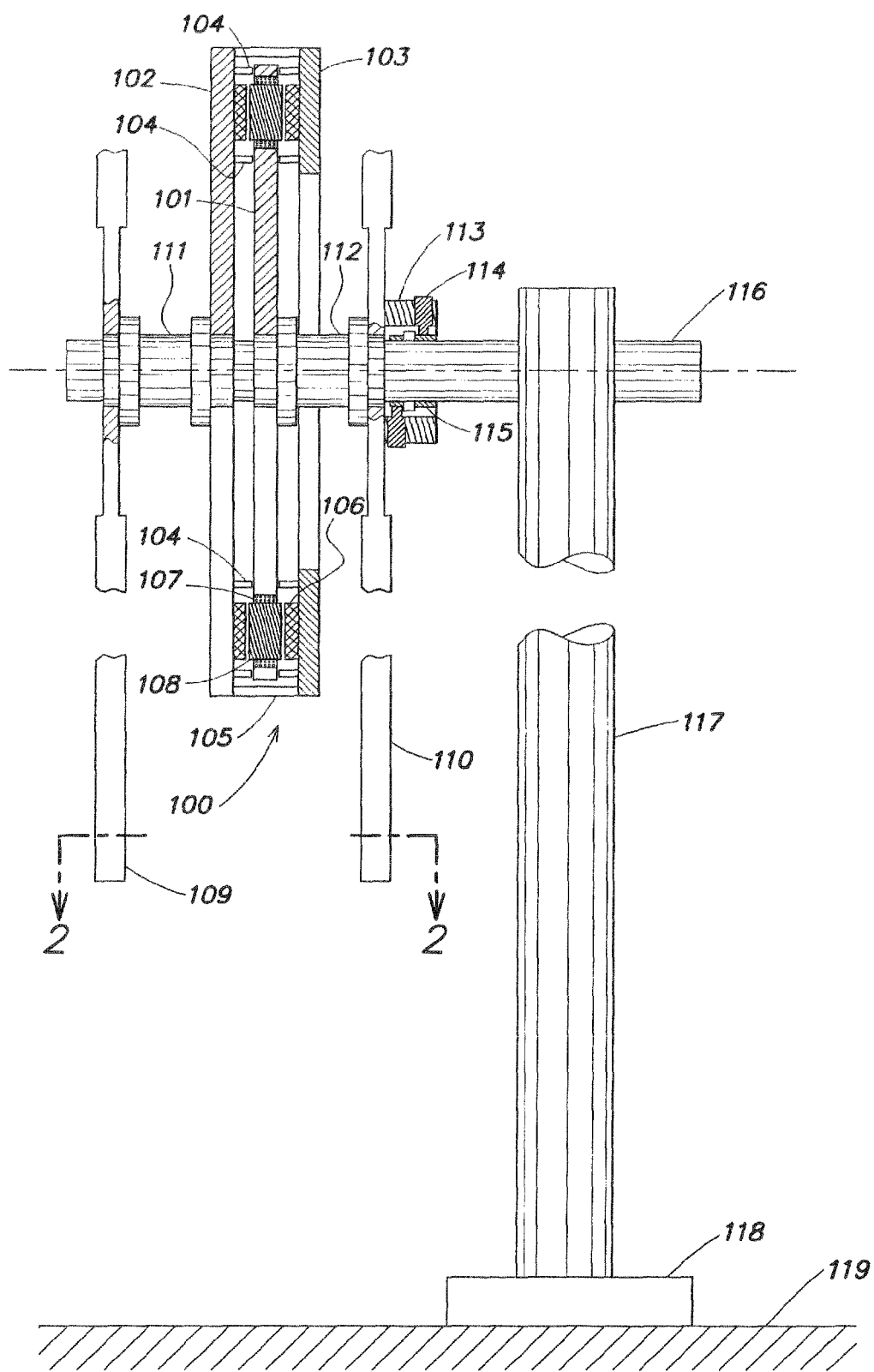
FIG. 1 is a side view, partial cross section of wind turbine arrangement with an alternator in accordance with the present invention.

Referring to the accompanying drawings wherein like reference numerals refer to the same or similar elements, FIG. 1 shows a wind turbine arrangement including an axial flux alternator in accordance with the invention, designated generally as 100. The alternator 100, or alternator section, includes three disks, a coil disk 101, a main or primary magnetic disk 102 and a secondary magnetic disk 103. Supporting elements 105 mechanically connect the secondary magnetic disk 103 to the primary magnetic disk 102. Supporting elements 105 may be a plurality of rigid members distributed over the circumference of the primary and secondary disks 102, 103. Although three disks 101, 102, 103 are shown in FIG. 1, one of which is a coil disk and the other two of which are magnetic disks, at a minimum, the alternator section 100 includes one magnetic disk and one coil disk, see FIG. 11 described below, and may also include any number of additional magnetic disks and/or coil disks with each magnetic disk being arranged opposite a coil disk, or vice versa. For example, an alternator section may include two coil disks and three magnetic disks, see FIG. 13 described below.

Figure 5:
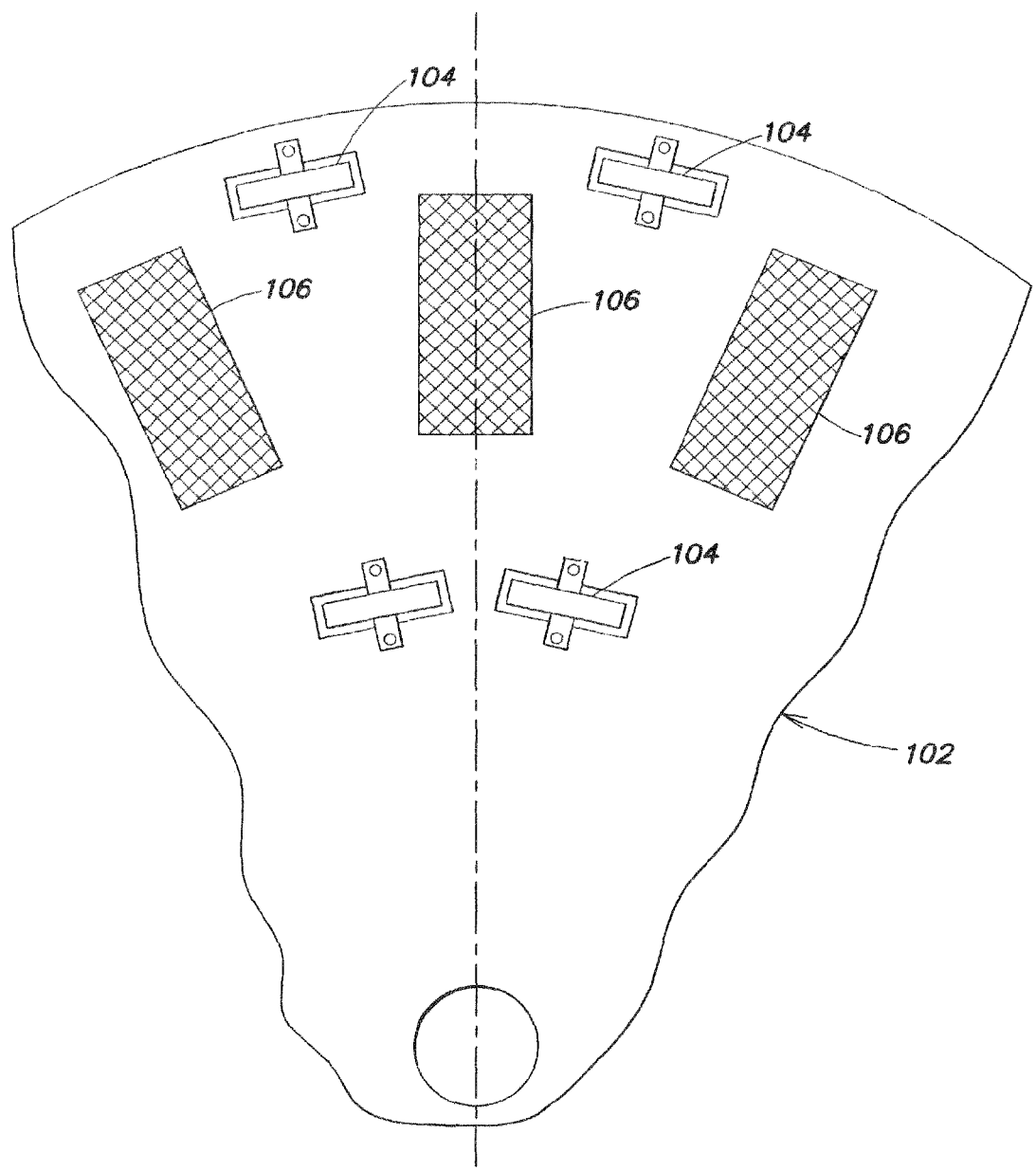
FIG. 5 shows the main magnetic disk in the alternator in accordance with the present invention.
Figure 6:
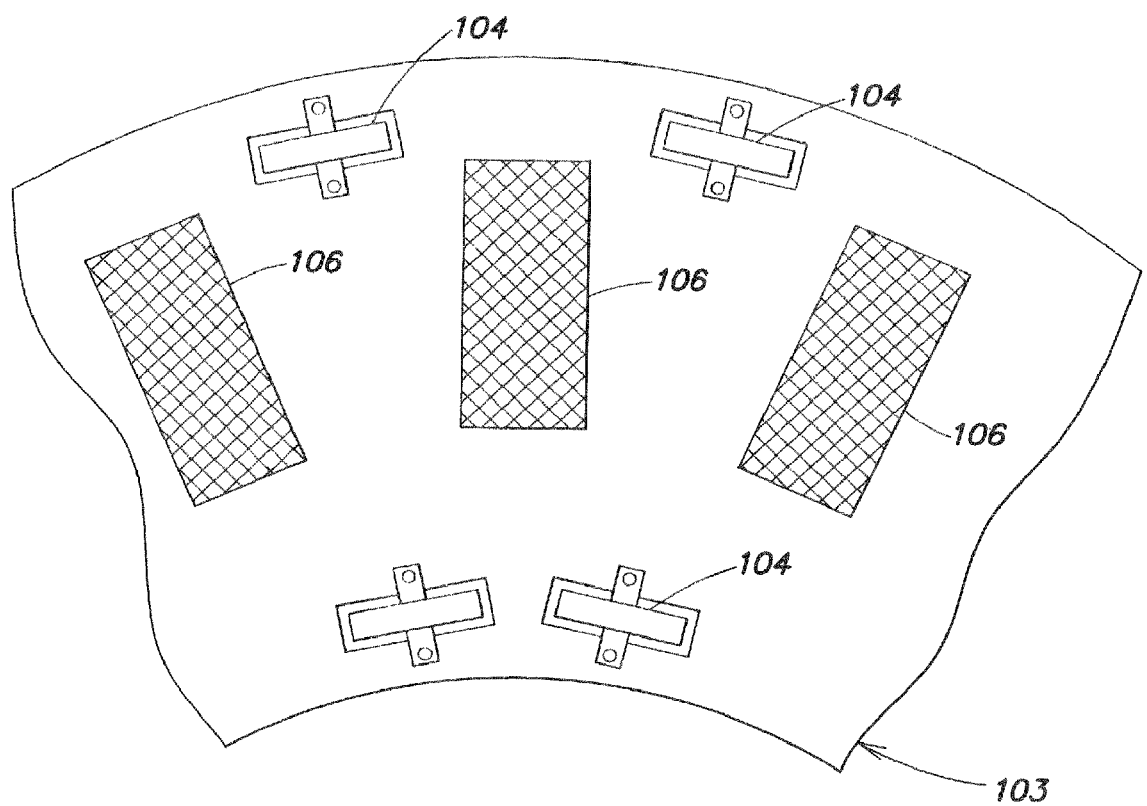
FIG. 6 shows the secondary magnetic disk in the alternator in accordance with the present invention.

Rolling elements 104 are assembled, manufactured or otherwise constructed and then fixed to the primary and secondary magnetic disks 102, 103 and roll on or against the opposing surfaces of the coil disk 101. Alternately, rolling elements 104 may be fixed to the coil disk 101 and roll on or against the opposing surfaces of the primary and secondary magnetic disks 102, 103. Rolling elements 104 are preferably ball bearings or cylinder bearings, but other rolling elements can be used in the invention. As shown, rolling elements 104 are situated both radially inward and radially outward of magnets 106, alternator coils 107 and magnetic cores 108. However, it is possible to position the rolling elements 104 only radially inward of the magnets 106, alternator coils 107 and magnetic cores 108 or only radially outward of the magnets 106, alternator coils 107 and magnetic cores 108. The presence of rolling elements 104 both radially inward and radially outward of the magnets 106, alternator coils 107 and magnetic cores 108 as illustrated in FIGS. 1, 5 and 6 is preferred.

Magnets 106 are mechanically connected to the primary and secondary magnetic disks 102 and 103 and are preferably rare earth magnets. Other types of magnets can be used.

Alternator coils 107 are wound around the magnetic cores 108, e.g., one or more coils 107 around each magnetic core 108, to form electromagnetic assemblies. The magnetic cores 108 are preferably made from laminations of silicon steel, but other types of magnetic steel can be used. The electromagnetic assemblies of the coils 107 and magnetic cores 108 are connected to the coil disk 101.

Two sets of wind turbines 109, 110 are arranged about a common and stationary shaft 116 of the arrangement. Wind turbines 109, 110 may be constructed to rotate in opposite directions when exposed to the same wind, and this is a preferred embodiment as it increases the relative angular velocity between the electromagnetic assemblies on the coil disk 101 and the magnets 106 on the primary and secondary disks 102, 103.

Bearing housings 111 and 112 mechanically connect the wind turbines 109 and 110 to the primary magnetic disk 102 and the coil disk 101, respectively. Bearing housings 111 and 112 enable rotation of the turbines 109, 110 and thus the coil disk 101 coupled to the wind turbine 110, and the primary and secondary magnetic disks 102, 103 coupled to the wind turbine 109, around the stationary shaft 116. Bearing housings 111 and 112 house or contain bearings, not showing in the drawings. One skilled in the art would be able to determine the size, type and construction of such bearings that are needed to enable rotation of the wind turbines 109, 110 relative to the stationary shaft 116.

A carbon brush assembly enables transmission of electricity generated by the rotational parts of the alternator section 100 to a stationary section of the wind turbine arrangement. The carbon brush assembly includes a carbon brush housing 113, carbon brushes 114 and stationary slippery rings 115 that transmit the electricity power from the carbon brushes 114 to the stationary section of the wind turbine arrangement. Electrical wiring and connections are not shown in FIG. 1.

The shaft 116 is supported on a main tower assembly 117 that is, in turn, supported by a base 118 resting on ground 119 or another supporting structure.

FIG. 2 shows the cross section of the turbine blades of the wind turbines 109 and 110 along line 2-2 in FIG. 1. When the blades of the wind turbines 109, 110 are exposed to the same wind, in the direction of arrow 121, they are caused to rotate in opposite directions, i.e., wind turbine 109 in the direction of arrow 123 and wind turbine 110 in the direction of arrow 122. This difference in the rotation direction arises from the construction and formation of the profiles of the blades as shown in FIG. 2.

FIG. 3 shows greater details of the alternator section 100. Air gaps 120 can be seen in FIG. 3 between the surfaces of the magnets 106 and the surfaces of the magnetic cores 108. The size of the air gaps 120 are determined by the diameter of the rolling elements 104 and by the size of the supporting elements 105. Typical air gaps 120 that can be used are from about 1.5 mm to about 3.0 mm, although this range is not limiting and other sizes of air gaps can be used as well. A particular size air gap 120 that may be used is 2.0 mm.

Accordingly, once it is determined what size air gap 120 is desired, in consideration of EMF generated by the rotation of the wind turbines 109, 110 and/or other characteristics of the arrangement including the alternator section 100, such as the diameter of the wind turbines 109, 110 and the weight of the wind turbines 109, 110 and parts thereof, the rolling elements 104 are selected to provide this size air gap.

Figure 4A:
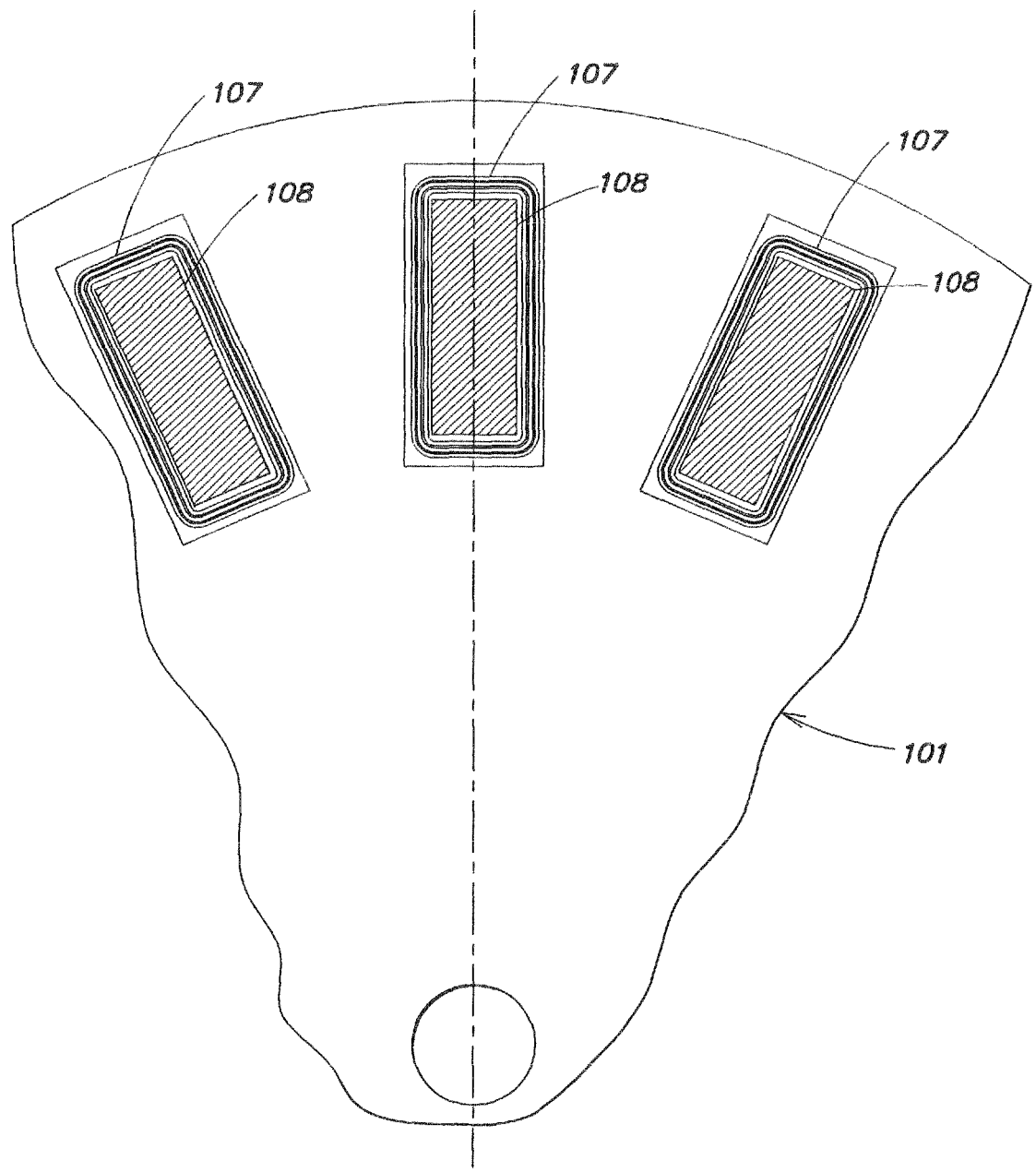
FIG. 4A shows one embodiment of the coil disk in the alternator in accordance with the present invention.

FIG. 4A shows a segment of the coil disk 101, i.e., a front or rear view. In one embodiment, the coil disk 101 is made from a sandwich of fiberglass and non-metallic honeycomb material, i.e., a composite material, and this composite provides a good ratio between strength and weight without being electricity conductive, which is important to avoid eddy currents. Other materials can be used without deviating from the scope and spirit of the invention.

Electromagnetic assemblies, i.e., the coils 107 wound around the magnetic cores 108, are arranged angularly on the outer portion of coil disk 101. The number of electromagnetic assemblies that can be used depends on, for example, the diameter of the coil disk 101. A larger number of electromagnetic assemblies will provide more power from a given size of coil disk 101. The surfaces of the magnetic cores 108 are exposed from both sides of the coil disk 101 to the magnets 106 on the primary and secondary magnetic disks 102, 103 so that the magnetic flux of two magnets 106 pass through the magnetic cores 108 simultaneously, thereby increasing the EMF of the alternator section 100.

Figure 4B:
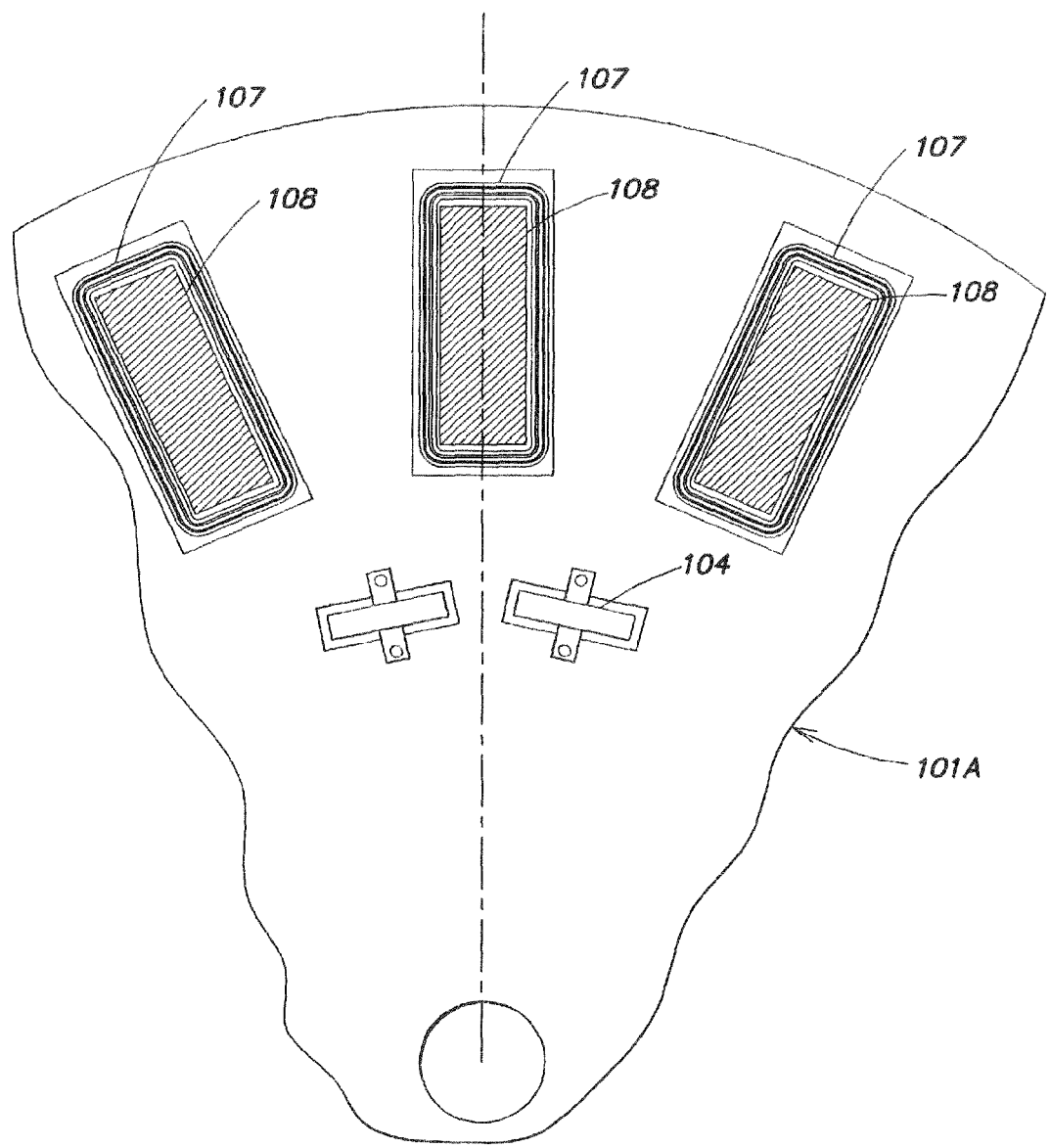
FIG. 4B shows another embodiment of the coil disk in the alternator in accordance with the present invention.

FIG. 4B shows an embodiment wherein the coil disk 101A includes rolling elements 104 arranged in a ring radially inward of the electromagnetic assemblies. Rolling elements 104 may alternatively or additionally be arranged in a ring radially outward of the electromagnetic assemblies.

FIG. 5 shows a segment of the primary magnetic disk 102, i.e., a front or rear view. The primary magnetic disk 102 may be made from a sandwich of carbon fiber and honeycomb material, i.e., a composite material, and this composite material provides a very good strength to weigh ratio. Other materials can be used without deviating from the scope and spirit of the invention.

Magnets 106 are arranged on the outer portion of the coil disk 101 and the rolling elements 104 are arranged in an outer ring, radially outward of the magnets 106, and in an inner ring, radially inward of the magnets 106. It is advantageous, but not essential, that the magnets 106 are supported from both sides by rolling elements 104 in order to balance the strong attraction force between the magnets 106 and the magnetic cores 108. Rolling elements 104 may be placed in, for example, rectangular or square holes in the coil disk 101 as shown in FIG. 4A, which holes allow the rolling elements 104 to rotate and to be supported from both sides by a shaft 127 (see FIG. 7).

When the rolling elements 104 are fixed on the surface of the coil disk 101 and roll on or against the surface of the primary magnetic disk 102, the distance between the coil disk 101 and the primary magnetic disk 102 is substantially constant. In this embodiment of the invention, the distance between the primary magnetic disk 102 and the coil disk 101 is equal to approximately one half of the diameter of the rolling elements 104. In addition, the size of the air gap 120 between the surfaces of the magnets 106 and the surfaces of the cores 108 may be substantially constant. Thus, each rolling element 104 is interposed between one surface of the primary magnetic disk 102 and an opposing surface of the coil disk 101, whether fixed to the primary magnetic disk 102 and rolling on or against the surface of the coil disk 101 or fixed to the coil disk 101 and rolling on or against the surface of the primary magnetic disk 102. Some rolling elements 104 may be fixed to the coil disk 101 and others to the primary magnetic disk 102.

When the secondary magnetic disk 103 is present, an additional set of rolling elements 104 may be fixed on the surface of the coil disk 101 facing the secondary magnetic disk 103 and roll on or against the surface of the secondary magnetic disk 103 such that the distance between the coil disk 101 and the secondary magnetic disk 103 is also substantially constant. Each rolling element 104 is interposed between one surface of the secondary magnetic disk 103 and an opposing surface of the coil disk 101, whether fixed to the secondary magnetic disk 103 and rolling on or against the surface of the coil disk 101 or fixed to the coil disk 101 and rolling on or against the surface of the secondary magnetic disk 103. Some rolling elements 104 may be fixed to the coil disk 101 and others to the secondary magnetic disk 103. It is also possible to have the same rolling elements fixed to the coil disk 101 and roll on or against surfaces of both the primary magnetic disk 102 and the secondary magnetic disk 103.

The number of magnets 106 on the coil disk 101 can vary, but more magnets 106 provide a higher frequency that, in turn, increases the EMS for a given RPM of the wind turbines 109, 110.

FIG. 6 shows a segment of the secondary magnetic disk 103, i.e., a front or rear view, that is mechanically connected to the primary magnetic disk 102 via supporting elements 105. Supporting elements 105 serve to transfer rotation from the primary magnetic disk 102 to the secondary magnetic disk 103. The construction, composition and other properties of the secondary magnetic disk 103 may be the same as or similar to that of the primary magnetic disk 102.

Figure 7:
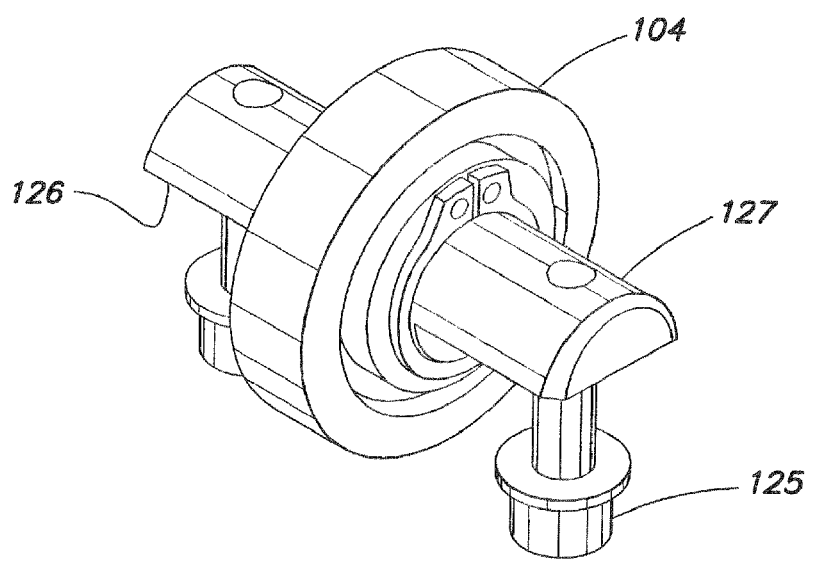
FIG. 7 shows the rolling element in the alternator in accordance with the present invention.

FIG. 7 shows a non-limiting, exemplifying rolling element 104. Rolling element 104 is preferably a ball bearing, but other types of rolling elements can be used. As shown in FIG. 7, rolling element 104 includes a shaft 127 extending through a center of the roller, i.e., about which shaft 127 the roller rotates, and that is tighten or otherwise attached to the surface of the primary magnetic disk 102 or the secondary magnetic disk 103 by a screw 125 such that a machined plane 126 of the rolling element 104 rests on the surface of the primary magnetic disk 102 or the secondary magnetic disk 103. One such screw 125 is arranged at each end region of the shaft 127 to provide support for the shaft 127 and thus for the rolling element 104. Different mechanisms for attaching the shaft 127 to the primary magnetic disk 102 or the secondary magnetic disk 103 may be used in the invention.

Figure 8:
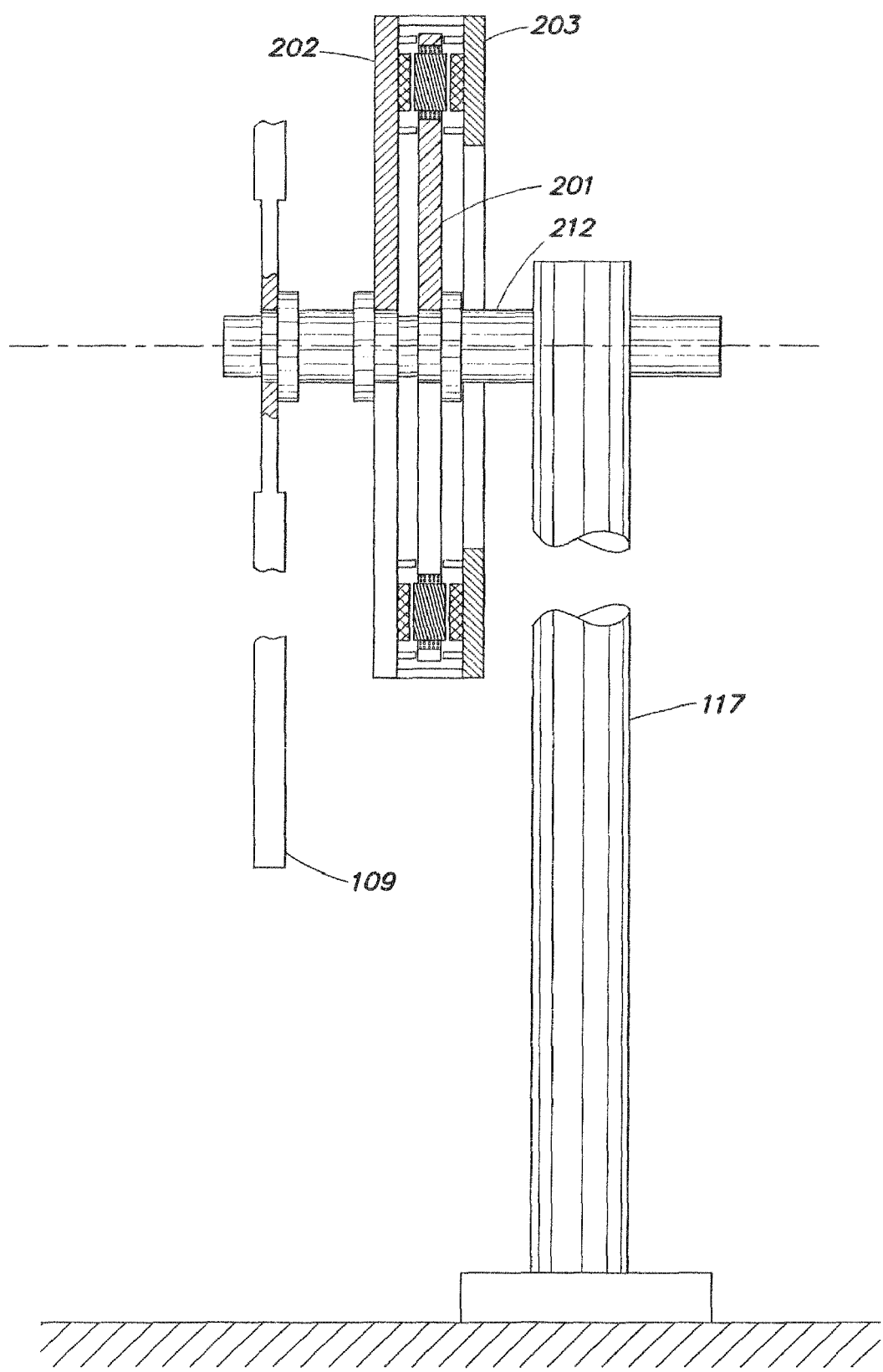
FIG. 8 shows another embodiment of a wind turbine arrangement including an alternator in accordance with the present invention.

FIG. 8 shows another embodiment of the invention wherein there is only a set of turbine blades on a single wind turbine 109. A coil disk 201 is stationary and mechanically connected to the main tower assembly 117 through a coupling 212 so that it is non-rotational and fixed in place. A main or primary magnetic disk 202 has the same or similar construction, composition and other properties as primary magnetic disk 102, while secondary magnetic disk 203 has the same or similar construction, composition and other properties as secondary magnetic disk 103. Remaining features of this embodiment are the same or similar to those described above.

The embodiment shown in FIG. 8 is simpler than the embodiment shown in FIG. 1, but the relative RPM between the primary and secondary magnetic disks 202, 203 and the coil disk 201 is approximately half that for a given wind relative to the embodiment shown in FIG. 1 and thus, the generated EMF is approximately half as well.

FIG. 9 shows a portion of an alternator in accordance with the invention wherein the magnets 106 on the primary and secondary magnetic disks 102, 103 are mounted to a supporting element 130 in pairs. As shown more clearly in FIG. 10, a supporting element 130 supports a pair of magnets 106. Supporting elements 130, each with a pair of magnets 106, are then attached or fixed to the primary and secondary magnetic disks 102, 103. Supporting elements 130 may support more than two magnets 106.

Supporting elements 130 are preferably made of magnetic steel, such as low-carbon magnetic steel, and serve to increase the magnetic flux thereby increasing the EMS of the alternator section 100.

Figure 11:
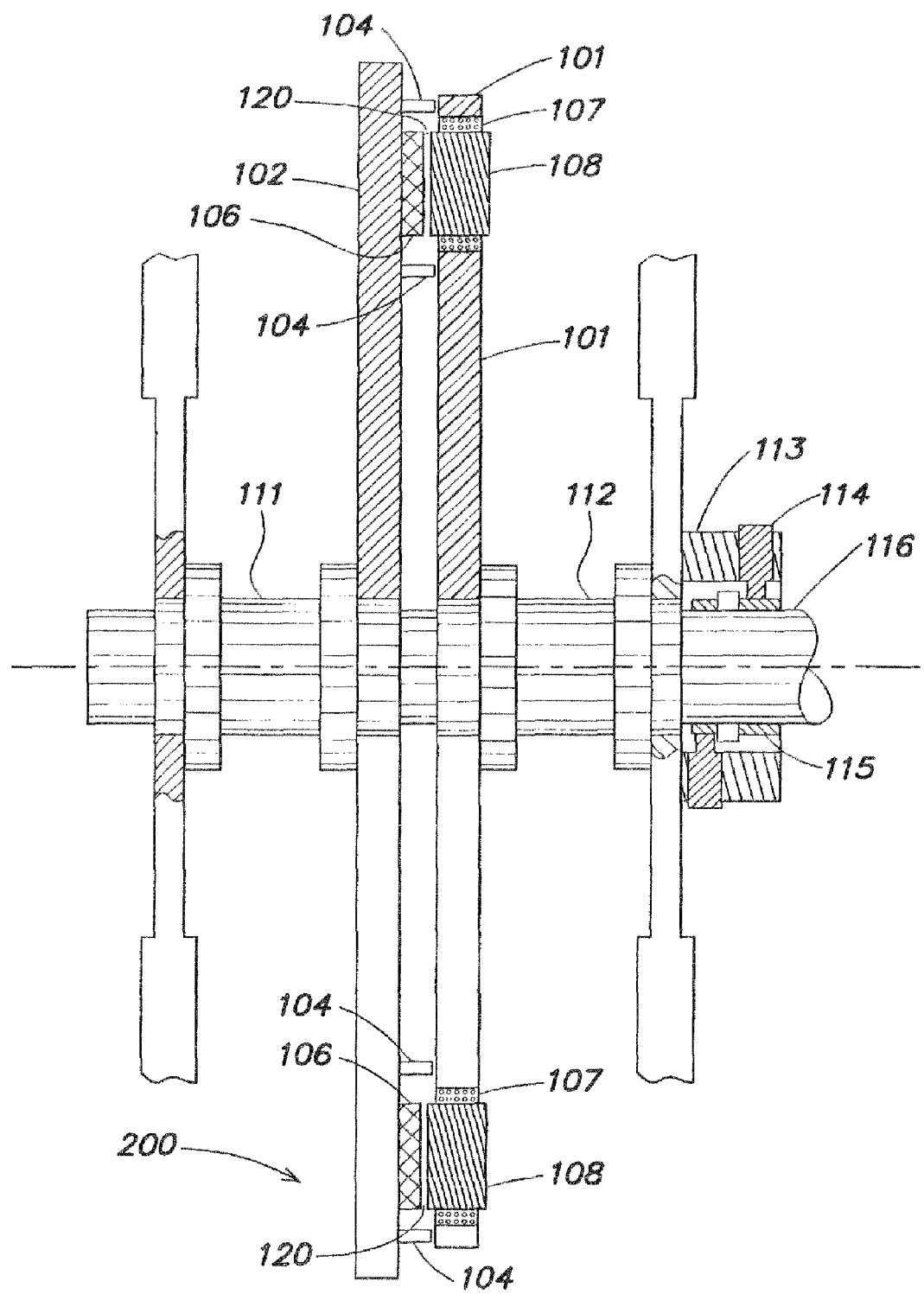
FIG. 11 shows yet another embodiment of a wind turbine arrangement including an alternator in accordance with the present invention.

FIGS. 11 and 12 show an embodiment wherein the alternator section 200 includes only the primary magnetic disk 102, and no secondary magnetic disk 103, and wherein the magnets are mounted in supporting elements 130. This arrangement is not as efficient as the embodiment shown in FIG. 1 because each magnetic core 108 is cooperating with only one set of magnets 106 on the primary magnetic disk 102, and not two sets as in the embodiment shown in FIG. 1.

Figure 13:
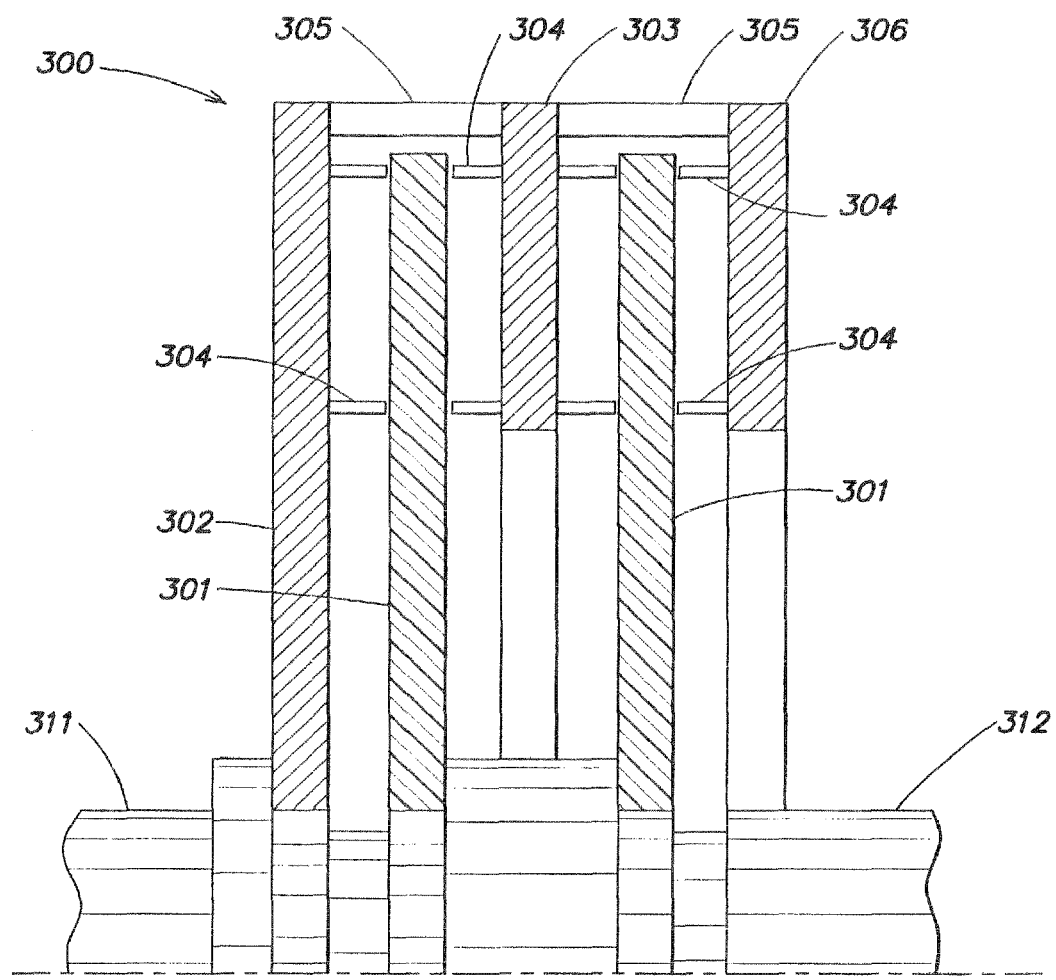
FIG. 13 is a partial view of another embodiment of a wind turbine arrangement including an alternator in accordance with the present invention that includes two coil disks and three magnetic disks.

FIG. 13 shows an embodiment wherein the alternator section 300 includes two coil disks 301, a primary magnetic disk 302, a secondary magnetic disk 303 connected to the primary magnetic disk 302 by supporting elements 105, and a third magnetic disk 306 connected to the secondary magnetic disk 303 by supporting elements 305. Supporting elements 305 correspond to supporting elements 105 described above and rolling elements 304, situated between the coil disks 301 and the magnetic disks 302, 303, 306, correspond to rolling elements 104. Bearing housings 311, 312 correspond to bearing housings 111 and 112, respectively.

Figure 14:
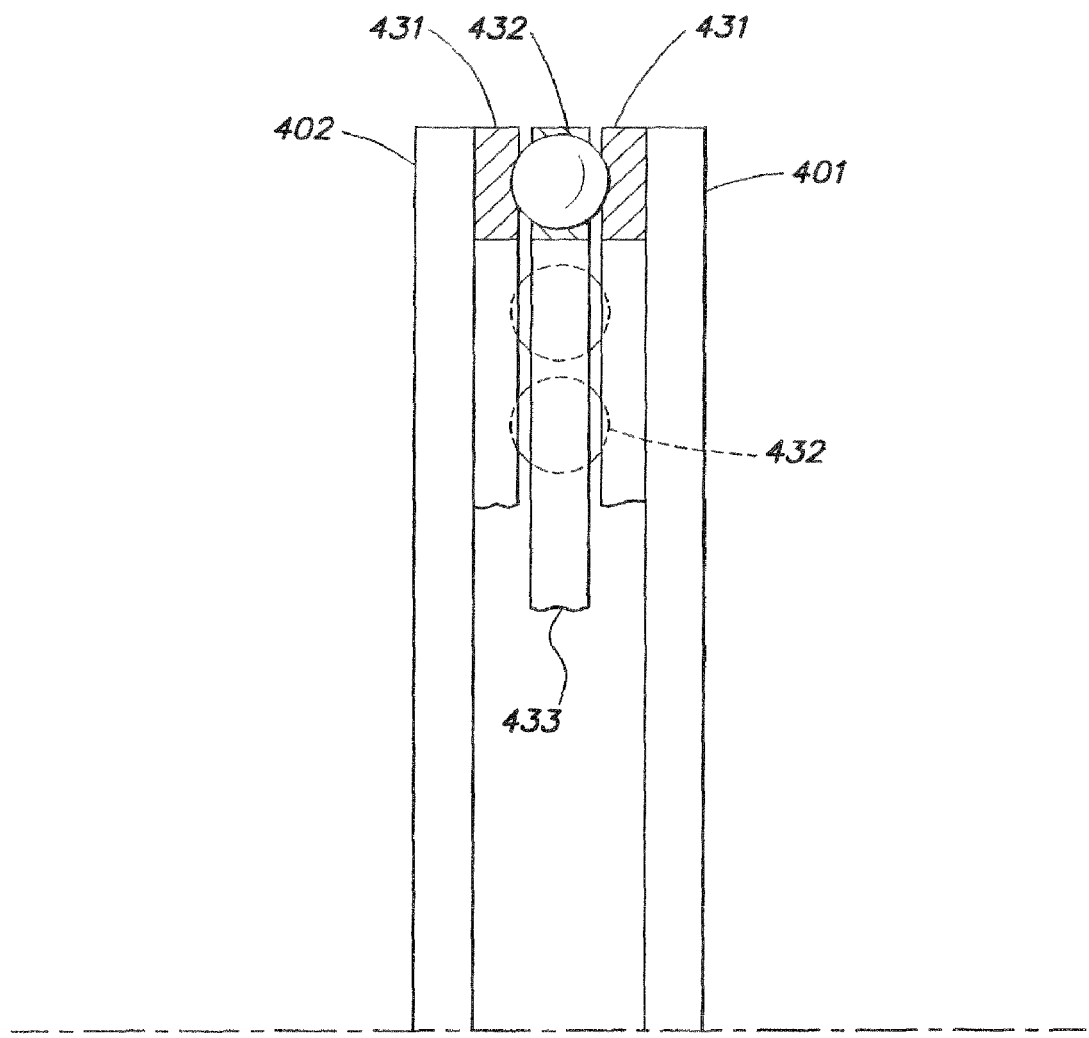
FIG. 14 is a partial view of yet another embodiment of a wind turbine arrangement including an alternator in accordance with the invention that includes thrust bearings as rolling elements.

FIG. 14 shows part of an embodiment of an alternator in accordance with the invention wherein a coil disk 401 and a primary magnetic disk 402 have substantially the same or similar properties as coil disk 101 and primary magnetic disk 102, respectively, described above, or any of the other coil disks and magnetic disks described herein. As for rolling elements, the embodiment shown in FIG. 14 includes thrust bearings that maintain the air gap between the surfaces of the magnets (not shown) on the magnetic disk 402 and the surfaces of the magnetic cores (not shown) of the electromagnetic assemblies on the coil disk 401.

Thrust bearings are preferably large diameter thrust bearing. Exemplifying thrust bearings for use in the invention include a cage assembly 433 of bearings 432 that have a spherical or cylindrical shape, and may be made from ceramic or steel. One ring 431 is situated between the bearings 432 and the coil disk 401, attached to the coil disk 401, and another ring 431 is situated between the bearings 432 and the primary magnetic disk 402, attached to the primary magnetic disk 402. Bearings 432 are thus enclosed by the cage assembly 433 and rings 431 and enable relative rotational movement between the coil disk 401 and the primary magnetic disk 402.

Technical details of thrust bearings are well known in the field of bearings. The selection of appropriate, commercial or specially designed thrust bearings for use in the invention is possible for one skilled in the art to which this invention pertains, without undue experimentation, in view of the disclosure herein.

All of the features described in each of the above embodiments may be applied in any of the other embodiments, the extent possible.

Operation of the arrangement shown in FIG. 1 will now be described. When the blades of the wind turbines 109 and 110 are expose to wind, they rotate in opposite directions and the rotational force is transmitted from the blades through bearing housing 111 and 112 to the primary magnetic disk 102 and to the coil disk 101, respectively. Primary magnetic disk 102 transmits its rotation to the secondary magnetic disk 103 via supporting elements 105. The electromagnetic assemblies on the coil disk 101 rotate through the magnetic flux generated by the magnets 106 on the primary and secondary magnetic disks 102 and 103 at a relative angular velocity that is twice the velocity of the wind turbines 109 or 110. Motion of the coils 107 through the magnetic flux causes induction of EMF in the coils 107 that causes current through a connected load.

Strong attraction forces between the magnets 106 and the magnetic cores 108 are balanced by the rolling elements 104 that provide a force in a direction separating the magnet is 106 from the magnetic cores 108 thereby maintaining an air gap 120 between the magnets 106 and the magnetic cores 108 and allowing the relative motion between the disks 101, 102, 103.

The angular positioning of the coils 107 relative to the angular positioning of the magnets 106 will be preferably in multi-phase order to avoid an angular positioning wherein all the magnetic cores 108 and the magnets 106 are in peak attraction together.

The coils of each phase may be arranged in parallel or serial connections. The outlet of all phases may be connected in Y or delta connections, which connections are known to professional electricians and other skilled in the art to which this invention pertains. The phases may then be connected to a multi-phase rectifier, and the rectifier's two-wire outlet may be connected to a load through the carbon brush assembly. Other types of connections are possible.

In the embodiment of the invention shown in FIG. 8, the coil disk 201 is stationary, and the primary and second magnetic disks 202 and 203 move. Rectified electricity passes directly to the load without the need of carbon brush assembly. All other details of the operation of the embodiment shown in FIG. 2 are identical to those of the embodiment shown in FIG. 1.

The above description and discussion relates to an axial flux alternator having a specific construction. However, all axial flux alternators that have at least one magnetic disk and at least one coil disk, at least one of which rotates relative to the other, and which define air gaps between magnets on the magnetic disk and magnetic cores on an adjacent coil disk, which air gaps are fixed and maintained by rolling elements attached to one of the disks and roll on or against the surface of the other, adjacent disks, or between the surfaces of the adjacent disks, are intended to be encompassed and protected by this patent application.

The disclosure above also relates to a method for designing a wind turbine arrangement for improved operation relative to existing wind turbine arrangements. The method seeks to set and maintain air gaps 120 between magnets on a magnetic disk and magnetic cores on a coil disk, between which disks there is relative rotation. This method for maintaining operability of a wind turbine arrangement would therefore include rotatably coupling the coil disk and/or the magnetic disk to a respective wind turbine to cause, when the wind turbine(s) is/are exposed to wind, relative rotation between the coil disk and the magnetic disk during which the magnetic cores of the coil disk and the magnets of the magnetic disk are brought into and out of magnetic engagement with one another, i.e., the magnetic cores pass into and out of the magnetic fields generated by the magnets. This causes generation of electricity in a manner known to those skilled in the art.

Rolling elements, as described above, are interposed between a surface of the coil disk and a surface of the magnetic disk that face each other to maintain the air gaps between a surface of the magnetic cores of the coil disk and the magnets of the magnetic disk to enable the relative rotation between the coil disk and the magnetic disk. Contact between the magnets and the magnetic cores could prevent operation of the wind turbine arrangement and possibly damage the arrangement.

The rolling elements are selected to maintain the air gaps in a range from, for example, about 1.5 mm to about 3.0 mm. The size of the air gaps may be determined first, based on for example, the dimensions and properties of the magnets and magnetic cores and desired EMF, and then the rolling elements selected which will provide this size air gaps.

When another magnetic disk is provided, as in FIG. 1, and the magnetic disks 102, 103 are connected to one another, a size of the supporting elements is also a factor in maintaining the air gaps within the desired range.

It is to be understood that the present invention is not limited to the embodiments described above, but includes any and all embodiments within the scope of the following claims. While the invention has been described above with respect to specific apparatus and specific implementations, it should be clear that various modifications and alterations can be made, and various features of one embodiment can be included in other embodiments, within the scope of the present invention.

The invention claimed is:

1. A wind turbine arrangement, comprising:
an axial flux alternator for generating electricity, said alternator comprising:
a first coil disk;
magnetic cores arranged on said first coil disk;
a second magnetic disk arranged adjacent to said first coil disk;
magnets arranged on said second magnetic disk; and
rolling elements interposed between a surface of said first coil disk and a surface of said second magnetic disk that face each other, said rolling elements being arranged to maintain air gaps between a surface of said magnetic cores on said first coil disk and said magnets on said second magnetic disk,
said alternator generating electricity from relative rotation between said first coil disk and said second magnetic disk during which said magnetic cores of said first coil disk and said magnets of said second magnetic disk are brought into and out of magnetic engagement with one another; and
at least one wind turbine, at least one of said first coil disk and said second magnetic disk being rotatably coupled to a respective one of said at least one wind turbine to cause, when said at least one wind turbine is exposed to wind, the relative rotation between said first coil disk and said second magnetic disk.

2. The wind turbine arrangement of claim 1, wherein said rolling elements are fixed to said first coil disk or to said second magnetic disk and roll, slide or move on or against the surface of the other of said first coil disk and said second magnetic disk.

3. The wind turbine arrangement of claim 1, wherein said rolling elements are movably retained between the surface of said first coil disk and the surface of said second magnetic disk and roll, slide or move on or against the surface of both of said first coil disk and said second magnetic disk.

4. The wind turbine arrangement of claim 3, wherein said rolling elements are thrust bearings including a first ring attached to said first coil disk, a second ring attached to said second magnetic disk and a cage assembly that retains rollers between said first and second rings.

5. The wind turbine arrangement of claim 1, wherein said alternator further comprises supporting elements arranged on said second magnetic disk, each of said supporting elements supporting at least two magnets and being constructed of a material to enable an increase in magnetic flux thereby increasing electromagnetic force of said alternator.

6. The wind turbine arrangement of claim 1, wherein said at least one wind turbine includes first and second wind turbines, said first coil disk being coupled to said first wind turbine and said second magnetic disk being coupled to said second wind turbine such that said first coil disk and said second magnetic disk are both rotatable when said first and second wind turbines are exposed to wind, said first wind turbine and thus said first coil disk being arranged to rotate in a first direction and said second wind turbine and thus said second magnetic disk being arranged to rotate in a second direction opposite to said first direction.

7. The wind turbine arrangement of claim 1, further comprising a shaft, said at least one of said first coil disk and said second magnetic disk that is rotatable being rotatably mounted to said shaft, the other of said first coil disk and said second magnetic disk that is not rotatable being stationary and fixed to said shaft.

8. The wind turbine arrangement of claim 1, wherein said alternator further comprises a third, magnetic disk arranged adjacent to said first coil disk and connected to said second magnetic disk, said second magnetic disk being arranged to face a first surface of said first coil disk and said third magnetic disk being arranged to face a second surface of said first coil disk on an opposite side of said first coil disk from said first surface of said first coil disk, said third magnetic disk comprising magnets arranged such that during the relative rotation between said first coil disk and said second and third magnetic disks, said magnetic cores of said first coil disk and said magnets of said second and third magnetic disks are brought into and out of magnetic engagement with one another.

9. The wind turbine arrangement of claim 8, wherein said alternator further comprises rigid connecting elements that connect said first and third magnetic, disks and that are arranged radially outward of said first coil disk.

10. The wind turbine arrangement of claim 1, wherein said rolling elements are arranged in a first ring to be radially inward of an area of magnetic engagement between said magnetic cores of said first coil disk and said magnets of said second magnetic disk and in a second ring to be radially outward of the area of magnetic engagement between said magnetic cores of said first coil disk and said magnets of said second magnetic disk.

11. The wind turbine arrangement of claim 1, further comprising a carbon brush assembly that transmits of electricity generated by said alternator to a stationary section of the arrangement.

12. The wind turbine arrangement of claim 1, wherein said alternator further comprises:
a third, magnetic disk arranged adjacent to said first coil disk and connected to said second magnetic disk such that said first coil disk is between said second and third magnetic disks;
a fourth coil disk arranged adjacent to said third magnetic disk and coupled to said first coil disk such that said third magnetic disk is between said first and fourth coil disks; and
a fifth magnetic disk arranged adjacent to said second coil disk and connected to said second and third magnetic disks such that said second coil disk is between said third and fifth magnetic disks.

13. A method for providing for and maintaining operability of a wind turbine arrangement, comprising:
providing at least wind turbine that rotates about an axis when exposed to wind;
providing an axial flux alternator including a first coil disk including magnetic cores and a second magnetic disk including magnets;
rotatably coupling at least one of the first coil disk and the second magnetic disk to a respective one of the at least one wind turbine to cause, when the at least one wind turbine is exposed to wind, relative rotation between the first coil disk and the second magnetic disk during which the magnetic cores of the first coil disk and the magnets of the second magnetic disk are brought into and out of magnetic engagement with one another; and
interposing rolling elements between a surface of the first coil disk and a surface of the second magnetic disk that face each other to maintain air gaps between a surface of the magnetic cores of the first coil disk and the magnets of the second magnetic disk.

14. The method of claim 13, further comprising selecting the rolling elements to maintain the air gaps in a range from about 1.5 mm to about 3.0 mm.

15. The method of claim 13, further comprising constructing the rolling elements to be fixed to the first coil disk or to the second magnetic disk and roll, slide or move on or against the surface of the other of the first coil disk and the second magnetic disk.

16. The method of claim 13, further comprising movably retaining the rolling elements between the surface of the first coil disk and the surface of the second magnetic disk such that the rolling elements roll, slide or move on or against the surface of both of the first coil disk and the second magnetic disk.

17. The method of claim 13, further comprising arranging the rolling elements in a first ring to be radially inward of an area of magnetic engagement between the magnetic cores of the first coil disk and the magnets of the second magnetic disk and in a second ring to be radially outward of the area of magnetic engagement between the magnetic cores of the first coil disk and the magnets of the second magnetic disk.

18. The method of claim 13, further comprising mounting the magnets of the second magnetic disk in groups of two or more, each group in a supporting element having properties to enable an increase in magnetic flux during the relative rotation between the first coil disk and the second magnetic disk.

19. The method of claim 13, further comprising selecting a diameter of the rolling elements based on a desired size of the air gaps.

20. The method of claim 13, further comprising:
arranging a third, magnetic disk adjacent to the first coil disk and connected to the second magnetic disk such that the first coil disk is between the second and third magnetic disks,
connecting the second and third magnetic disks using supporting elements; and
selecting a size of the supporting elements to maintain the air gaps within a desired range.

* * * * *